United States Patent
Salter et al.

(10) Patent No.: US 9,706,321 B2
(45) Date of Patent: Jul. 11, 2017

(54) ELECTRONIC DEVICE INCLUDING MODIFIABLE OUTPUT PARAMETER

(75) Inventors: Timothy Ryan Salter, Guelph (CA); Mark David Mesaros, Cambridge (CA)

(73) Assignee: BlackBerry Limited, Waterloo, Ontario (CA)

(*) Notice: Subject to any disclaimer, the term of this patent is extended or adjusted under 35 U.S.C. 154(b) by 982 days.

(21) Appl. No.: 13/335,656

(22) Filed: Dec. 22, 2011

(65) Prior Publication Data

US 2013/0163768 A1 Jun. 27, 2013

(51) Int. Cl.
*H04R 29/00* (2006.01)
*H04R 3/04* (2006.01)
*H04M 19/04* (2006.01)
*H04R 3/00* (2006.01)

(52) U.S. Cl.
CPC ........... *H04R 29/00* (2013.01); *H04M 19/042* (2013.01); *H04R 3/00* (2013.01); *H04R 3/04* (2013.01); *H04R 29/001* (2013.01)

(58) Field of Classification Search
CPC ........... H04M 2250/12; H04M 19/042; H04M 19/044; H04M 1/72569; H03G 3/32; H04R 29/00; H04R 3/00; H04R 29/001; H04R 3/04
USPC ..... 381/56, 104; 700/94; 455/90.2, 90.3, 73, 455/401, 400, 567
See application file for complete search history.

(56) References Cited

U.S. PATENT DOCUMENTS

| | | | |
|---|---|---|---|
| 6,246,761 B1* | 6/2001 | Cuddy | G08B 3/10 379/372 |
| 7,024,229 B2 | 4/2006 | Nishimura | |
| 7,142,678 B2 | 11/2006 | Falcon | |
| 2002/0006207 A1 | 1/2002 | Matero et al. | |
| 2005/0217457 A1* | 10/2005 | Yamamoto et al. | 84/464 R |
| 2005/0275508 A1* | 12/2005 | Orr et al. | 340/407.1 |
| 2006/0172770 A1* | 8/2006 | Fyke et al. | 455/557 |

(Continued)

FOREIGN PATENT DOCUMENTS

WO 2010092523 A1 8/2010

OTHER PUBLICATIONS

Mobile Apps—Date of Reference: Oct. 2007—Adjust your ring volume for ambient noisehttp://msdn.microsoft.com/en-ca/magazine/cc163341.aspx. pp. 1-9.

(Continued)

*Primary Examiner* — Vivian Chin
*Assistant Examiner* — Con P Tran
(74) *Attorney, Agent, or Firm* — Fish & Richardson P.C.

(57) ABSTRACT

A method and apparatus for executing a method for modifying an output parameter of an electronic device. The method and apparatus emits a first sound. The method and apparatus are further configured to receive a second sound at the electronic device, the second sound based at least in part on the first sound. The processor of the electronic device compares at least one characteristic of the first sound to at least one corresponding characteristic of the second sound. The processor further receives output data from at least one sensor and modifies an output parameter of the electronic device in response to the comparison of the first sound and the second sound and the output data from the at least one sensor.

14 Claims, 13 Drawing Sheets

(56) References Cited

U.S. PATENT DOCUMENTS

| | | | |
|---|---|---|---|
| 2007/0223717 A1* | 9/2007 | Boersma | 381/74 |
| 2007/0281744 A1 | 12/2007 | Andreasson | |
| 2008/0039021 A1* | 2/2008 | Fux et al. | 455/67.7 |
| 2008/0053328 A1 | 3/2008 | Ximenes | |
| 2008/0132290 A1 | 6/2008 | Sharabi et al. | |
| 2009/0022329 A1 | 1/2009 | Mahowald | |
| 2009/0063141 A1 | 3/2009 | Huang | |
| 2009/0143054 A1 | 6/2009 | Drescher et al. | |
| 2009/0167542 A1* | 7/2009 | Culbert et al. | 340/635 |
| 2009/0263100 A1 | 10/2009 | Neuman | |
| 2009/0312000 A1 | 12/2009 | Wakefield | |
| 2010/0195838 A1* | 8/2010 | Bright | 381/57 |
| 2010/0290633 A1* | 11/2010 | Chen et al. | 381/57 |
| 2010/0295678 A1 | 11/2010 | Suzuki et al. | |
| 2011/0003614 A1* | 1/2011 | Langereis et al. | 455/550.1 |
| 2011/0063104 A1* | 3/2011 | Idzik et al. | 340/533 |
| 2011/0148629 A1* | 6/2011 | Zhang | 340/540 |
| 2011/0201381 A1* | 8/2011 | Herz et al. | 455/550.1 |
| 2011/0294470 A1* | 12/2011 | Pasquero et al. | 455/412.2 |
| 2012/0025958 A1* | 2/2012 | Chuang et al. | 340/12.22 |
| 2012/0039489 A1* | 2/2012 | Chen et al. | 381/107 |
| 2012/0063607 A1* | 3/2012 | Tong et al. | 381/59 |
| 2013/0012270 A1* | 1/2013 | Naftolin | 455/566 |
| 2013/0079908 A1* | 3/2013 | Wu | 700/94 |
| 2013/0094866 A1* | 4/2013 | Pasquero et al. | 398/202 |
| 2013/0102362 A1* | 4/2013 | Inagaki | 455/563 |
| 2014/0004909 A1* | 1/2014 | Jiang | 455/567 |

OTHER PUBLICATIONS

Foxy Ring—Date of Reference: Aug. 27, 2009—LevelUp Studios—http://levelupstudio.com/foxyring. pp. 1-2.

Office Action mailed Apr. 30, 2014; in corresponding Canadian patent application No. 2,799,048.

Examination Report mailed Oct. 1, 2013, in corresponding European patent application No. 11195131.5.

Extended European Search report Apr. 27, 2012. In corresponding application No. 11195131.5.

* cited by examiner

ELECTRONIC DEVICE INCLUDING MODIFIABLE OUTPUT PARAMETER

FIELD OF TECHNOLOGY

The instant disclosure relates to an electronic device. More specifically, the instant disclosure relates to an electronic device and method for modifying an output parameter of the electronic device based on at least a received sound.

BACKGROUND

Electronic devices are capable of providing a variety of different information to an operator. For example, an electronic device can be enabled for providing telephonic services, internet services, playing music, playing videos, and data services, such as text messaging and email messaging. The electronic device can be carried by the operator in a variety of different manners for example in a holster, in a pocket, in a briefcase, in a bag, and in a purse. Additionally, the electronic device can be used in a variety of different settings, for example quiet settings, loud settings, airplane settings, indoors, outdoors, day time, and night time. An electronic device can provide communication notifications, such as visual display, ring tones, and vibrational alerts.

BRIEF DESCRIPTION OF THE DRAWINGS

Implementations of the present application will now be described, by way of example only, with reference to the attached Figures, wherein.

DETAILED DESCRIPTION

Figure 1:
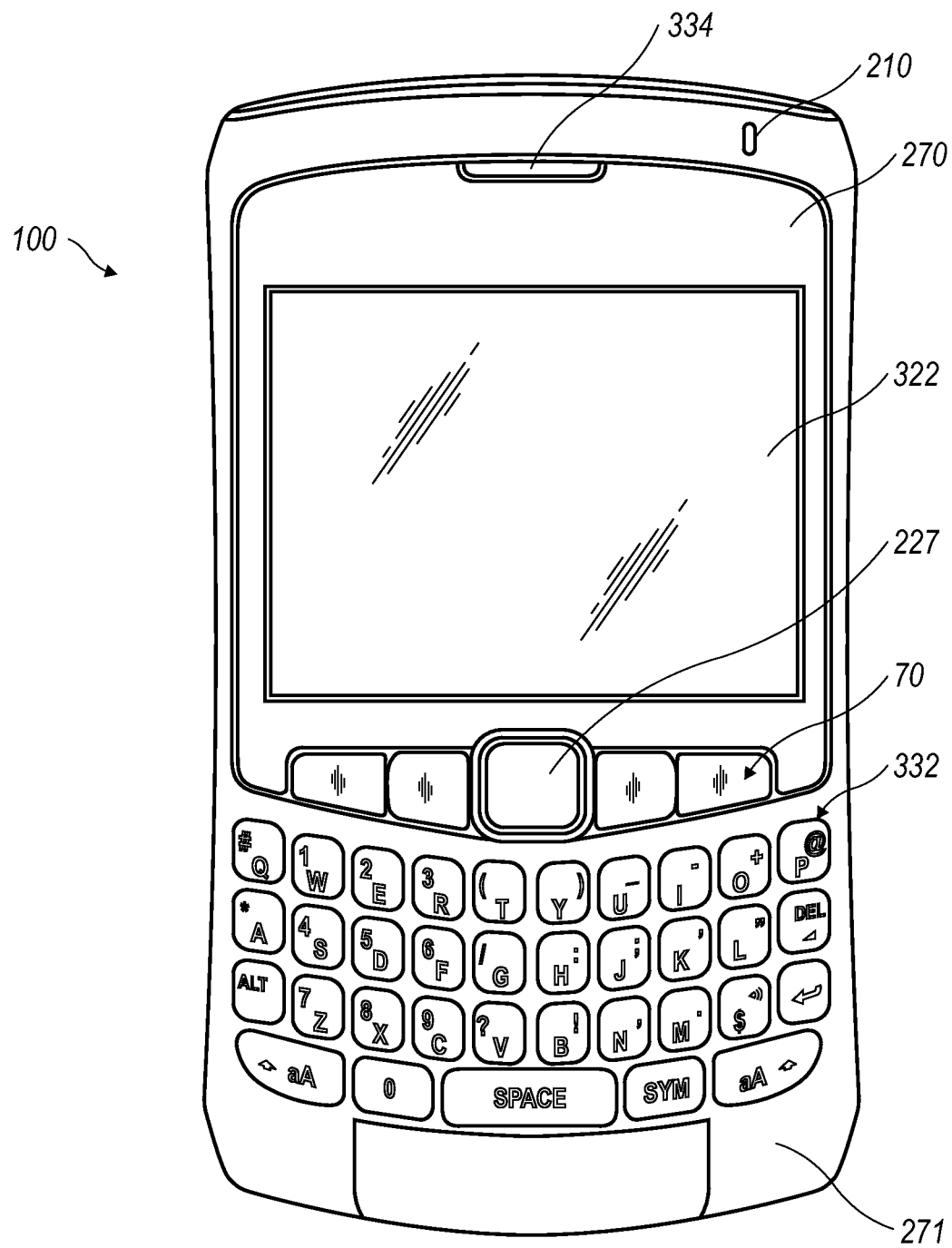
FIG. 1 is a front view of an electronic device in accordance with an exemplary implementation.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. The term "electronic device" is defined as any device that includes a processor. The electronic device generally includes its own power source (such as a rechargeable battery), although in some embodiments, the electronic device can receive power from an external source, such as an adapter or a charger. The electronic device can be a handheld wireless communication device, handheld wired communication device, personal digital assistant (PDA), cellular phone, smart phone, MP3 player, mobile station such as a cellular telephones smart telephone, portable gaming systems, portable audio and video players, electronic writing or typing tablets, mobile messaging devices, and portable computers (such as tablet computers or laptop computers). The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "holster" is used herein for convenience, and may include a variety of devices that receive, hold or carry electronic devices, including a conventional holster, a briefcase, a laptop bag, a backpack, a laptop sleeve, an electronic pad cover, a carrying case, a handbag, or other carrier. The term "holster sensor" is a sensor that is used to detect if an electronic device is within the holster. The holster sensor can include one or more of a magnetic sensor, a capacitive sensor, a radio-frequency identification (RFID) sensor, a proximity sensor, or any other sensor that can determine if an electronic device is in a holster. The term "processor module" refers to one or more components that are capable of executing commands and processing data. The processor module can include one or more processors. The processor module can also include one or more memory devices. The term "sound" as used herein refers to one or more sound signals transmitted through a solid, liquid, or gas and is composed of one or more frequencies. Sound as used herein can be audible to a human or inaudible to a human. The term "characteristic of sound" refers to one or more quantifiable properties of the sound, such as frequency and amplitude. The term "output parameter" is a quantifiable value of a signal emitted to control output from a notification device. An output parameter may be "modified" by, for example, setting the output parameter to a particular value or by changing (e.g., increasing or decreasing) the value. The "notification device" is device that is capable of producing a notification to the operator, such that the operator is informed about an event occurring on or at the electronic device. Some examples of notification devices include but are not limited to a display, a speaker, a vibrator, indicator light, and other devices which are capable of providing auditory, visual or tactile information to an operator. The output parameter can control one or more of sound emitted from a speaker, a light emitted from a notification light, or a display. The term "notification" refers to an output of the electronic device that can be interpreted by an operator of the electronic device. Examples of notifications include a display, a sound, a vibration, and a light. The term "ringtone" refers to a sound emitted from an electronic device to provide notification to the user of an event, which can be receipt of a phone call, receipt of a text message, transmission of a text message, transmission of an email, receipt of an email, an alarm, or another indication that an event has occurred on or at the electronic device. The ringtone can be any sound that is emitted from the electronic device that provides notification to the operator. The term "ambient area" refers to the area surrounding an object, such as the electronic device, that influences the reception or perception of sound. Ambient area can also be called the environment. The term "ambient noise" refers to sound in the ambient area. A "wireless communication" means communication that occurs without wires using electromagnetic radiation.

The present disclosure presents methods, systems and apparatuses for modifying output notifications from an electronic device in response to environmental conditions. In one example, a method of operating an electronic device is presented. The method can include emitting a first sound from the electronic device. As will be explained in greater detail below, the first sound can be a sound at a particular frequency, a sound composed of a variety of different frequencies, a sound with frequencies selected based upon the method as described herein, a sound with a variety of different amplitudes, a sound with a single amplitude, a sound composed of one or more of the above mentioned sounds. The method further can include receiving a second sound at the electronic device, the second sound based at least in part on the first sound. The portion of the second sound that is based on the first sound can be such that it is at least a reflected or attenuated sound of the first sound.

The method can also compare, at a processor of the electronic device, at least one characteristic of the first sound to at least one corresponding characteristic of the second sound. In at least one example, the at least one characteristic of the first sound includes a signal strength and a signal quality and the at least one corresponding characteristic of the second sound includes a signal strength and a signal quality. The present disclosure contemplates that other characteristics of the first sound and the second sound can be compared in addition to these characteristics or in place of these characteristics. The method can also include receiving, at the processor, output data from at least one sensor. The at least one sensor can be any of the sensors described below. In one example, the at least one sensor can be a holster sensor. The method can detect a presence of a holster sensor. The holster sensor can determine whether the electronic device is within a holster. In addition to detecting the presence of a holster sensor, the method can perform an additional detection of an ambient light sensor if the presence of the holster sensor is not detected. Additionally, the method can detect the presence of a paired device and determine if the paired device is an output device. The paired device can be a device that is separate from the electronic device that provides output to an operator. For example, the paired device can include but is not limited to BLUETOOTH® headset (which can include both a speaker and a microphone or just one of a speaker or microphone). The paired device sensor can be implemented as hardware or software so that the electronic device is able to detect the presence of a paired device.

The method can modify an output parameter of the electronic device in response to the comparison of the first sound and the second sound and the output data from the at least one additional sensor. The modification of the output parameter can be such that it provides the operator with enhanced notification of an event occurring on the electronic device. The notification is an enhanced notification as it takes into consideration at least one of an ambient noise, a second sound that can include a reflected or modified first sound that was emitted by the electronic device, and one or more sensors including but not limited to a holster sensor, an ambient light sensor, or paired device sensor. As indicated above, the output parameter can be output data that is capable of being transmitted to an output device. The output parameter can control one or more sounds emitting from a speaker, a light emitting from a notification light, or a user interface on a display. In another example, the output parameter is a ring tone and at least one of frequency or amplitude of the ring tone are varied based upon the output of the holster sensor and detected presence of the paired device.

In other examples, one or more of the at least one additional sensors can be implemented to provide data to the processor to determine the output parameter. For instance, at least one additional sensor can be an ambient light sensor and the modifying of the output parameter can be based upon the output data from the ambient light sensor. In another implementation, the at least one additional sensor can include a holster sensor and the modifying of the output parameter can be based upon the output data from the holster sensor. In yet another implementation, the at least one additional sensor can include a paired device sensor and the modifying of the output parameter can be based upon the output data from the paired device.

The above described method can be implemented on an electronic device. The electronic device can include at least one notification device, at least one sound output device, at least one sound receiving device, and at least one sensor. The at least one notification device can be a device that provides a notification to the operator of the electronic device. Some examples of notification devices include but are not limited to a display, a speaker, a vibrator, indicator light, and other devices which are capable of providing auditory, visual or tactile information to an operator. The at least one sound output device is a device that can be capable of producing sound waves. Examples of sound output devices include but are not limited to speakers, horns, and other sound producing devices. The at least one sound receiving device can be capable of receiving sound waves and generating data in response thereto. Examples of sound receiving devices include but are not limited to microphones. The at least one sound receiving device can be configured to process sounds within a particular frequency range or can process sounds in a wide range of frequencies. The at least one sensor can be configured to detect another aspect of the environment. For example the at least one sensor can be configured to detect ambient light, location of the device, whether the device is within a holster, and whether a paired device is coupled to the electronic device. In one or more implementations, only a single notification device, sound output device, sound receiving device, and sensor can be included on the electronic device. However, in many implementations there can be the two or more of a notification device, a sound output device, a sound receiving device, or a sensor.

The electronic device can include a processor module. The processor module can be coupled to at least one notification device, at least one sound output device, at least one sound receiving device, and at least one sensor. The processor module can be configured to execute a variety of different instructions. These instructions can include instructions to trigger emission of a first sound by the at least one sound output device. The processor module can also be configured to execute instructions to receive data from the sound receiving device indicative of a second sound with the second sound being based at least in part on the first sound. Additionally, the processor module can compare at least one characteristic of the first sound to at least one corresponding characteristic of the second sound. The processor module can receive data from the at least one sensor. Furthermore, the processor module can modify an output parameter in response to the comparison of the at least one characteristic of the first sound to a corresponding characteristic of the second sound and the data received from the at least one sensor, wherein the output parameter is transmitted to the at least one notification device.

The following description provides specific examples of the above described a system, a method and an apparatus for executing the method. The above described method and apparatus can include one or more of the features as presented herein.

Referring to FIG. 1, a front view of an electronic device 100 in accordance with an exemplary implementation is illustrated. FIG. 1 illustrates an electronic device 100 that is a mobile phone, for example a smart phone. However, those of ordinary skill in the art will appreciate that the electronic device 100 can also be any of the electronic devices as indicated above. As shown, the electronic device 100 has a keyboard 332. While the illustrated keyboard layout is a QWERTY layout, the present disclosure contemplates other standard layouts including but not limited to a QZERTY layout, a QWERTZ layout, an AZERTY layout, a Dvorak layout, a Russian keyboard layout, a Chinese keyboard layout, or other similar layout, as well as reduced keyboard layouts. In some examples, the keyboard 332 can be interchangeable such that the user can switch between layouts. In other examples, the keyboard is a virtual keyboard provided on a touch screen display (not shown). The electronic device 100 also can include a display 322 on a front face 270 of the body 271.

As can be appreciated from FIG. 1, the electronic device 100 comprises a lighted display 322 located above the keyboard 332 constituting a user input and suitable for accommodating textual input to the electronic device 100. The front face 270 of the electronic device 100 can have a navigation row 70. The electronic device 100 can include a notification indicator 210, such as a light emitting diode (LED) or other light source that provides visual notification to electronic device 100 operator. The notification indicator 210 can be configured to change colors and frequency to communicate different notifications to the operator. As shown, the electronic device 100 is of unibody construction, also known as a "candy-bar" design. In alternate implementations, the electronic device 100 can be a "clamshell" or a "slider" design.

As described above, the electronic device 100 can include an auxiliary input that acts as a cursor navigation tool 227 and which can be also exteriorly located upon the front face 270 of the electronic device 100. The front face location of the cursor navigation tool 227 allows the tool to be easily thumb-actuable like the keys of the keyboard 332. In the illustrated embodiment, the navigation tool 227 is in the form of an optical sensor. In other embodiments, the navigation tool can be laser sensor, a capacitive sensor, another sensor capable of detection motion or any combination of two or more of the above mentioned sensors. The navigation tool 227 can be utilized to instruct two-dimensional or three-dimensional screen cursor movement in substantially any direction, as well as act as an actuator when the navigation tool 227 is depressed like a button. Other navigation tools can be used, for example, a trackball. The placement of the navigation tool 227 can be above the keyboard 332 and below the display screen 322; here, the navigation tool 227 can avoid interference during keyboarding and does not block the operator's view of the display screen 322 during use.

Figure 2:
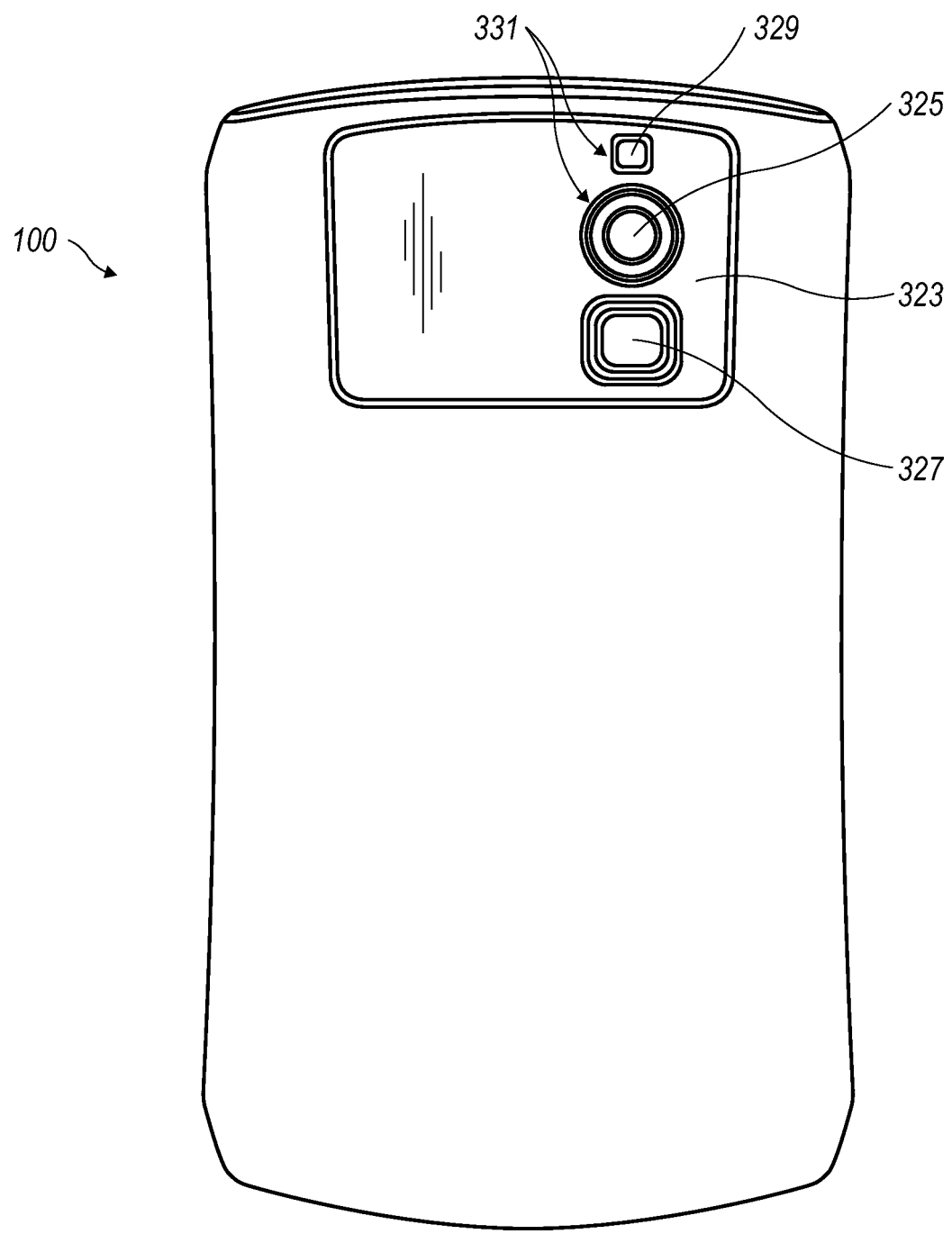
FIG. 2 is a rear view of an electronic device in accordance with an exemplary implementation.

As shown in FIG. 2, the electronic device 100 can also include a camera 323 to allow the user to take electronic photographs which can be referred to as photos or pictures. The camera 323 can also be enabled to allow for video recording. The camera 323 can include a lens 325, a photodetector such as a Charge Coupled Device (CCD) for light/image detection (not shown), as well as a flash assembly 327, such as an LED, for emitting light. In other embodiments the photodetector can be a complementary metal oxide semiconductor (CMOS). The camera 323 can be communicatively coupled with a processor module. The electronic device 100 can include an ambient light sensor 329 for sensing and detecting ambient light. The separate ambient light sensor 329 can be configured to sense at least one of a range of light levels and wavelengths. While both the camera 323 and the ambient light sensor 329 are illustrated it is appreciated that the electronic device 100 according to the present disclosure can only have one of a camera 323 or an ambient light sensor 329. When provided with only a camera 323, the camera 323 can be configured to obtain ambient light characteristics which include at least one of light level and light wavelengths.

Figure 3:
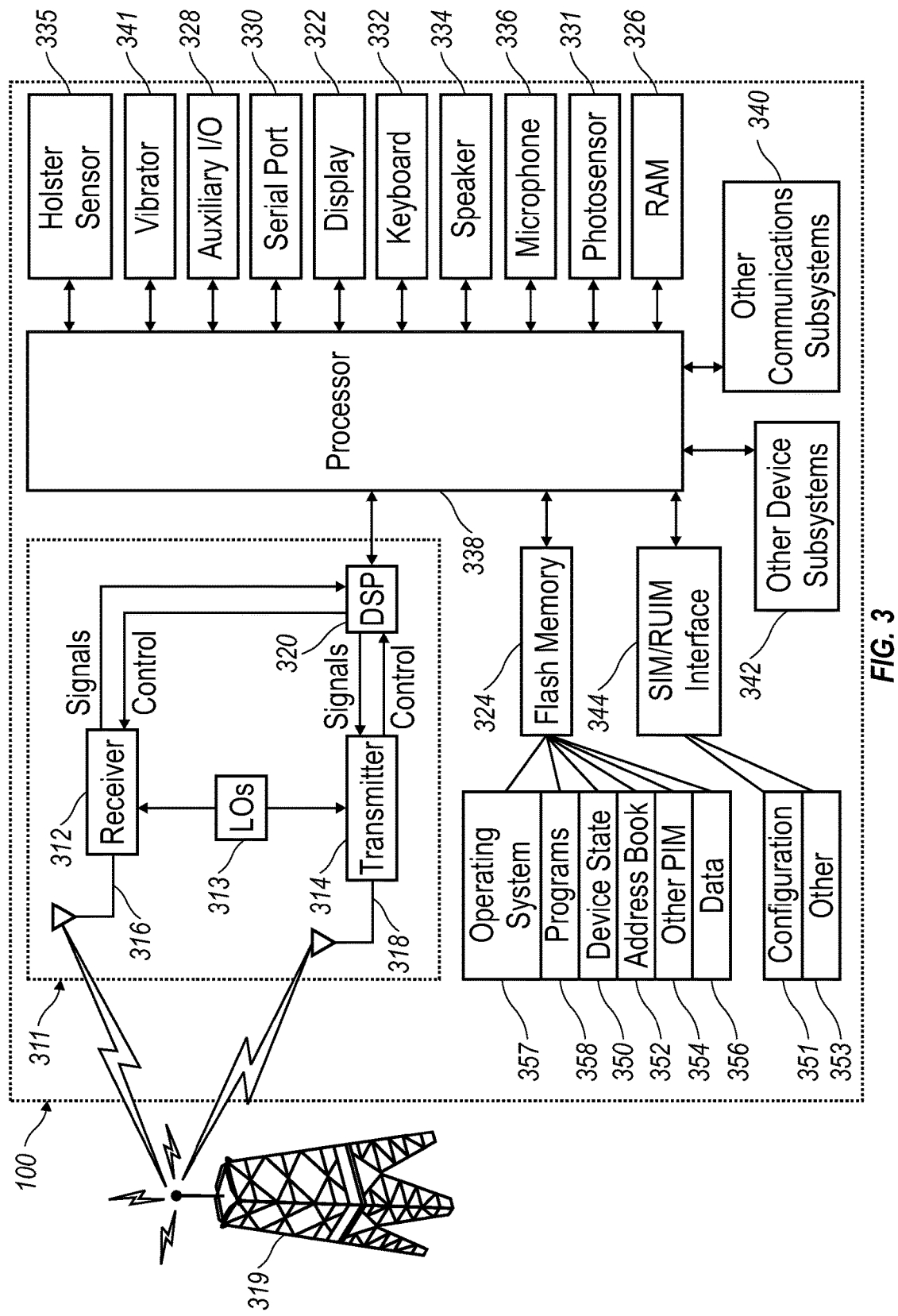
FIG. 3 is a block diagram representing an electronic device in accordance with an exemplary implementation.

FIG. 3 is an exemplarily block diagram of an exemplarily electronic device 100 according to the present disclosure. It will be appreciated that additional elements and modifications can be necessary to make the electronic device 100 work in particular network environments. As shown, the electronic device 100 includes a processor module 338 that controls the operation of the electronic device 100. The processor module 338 can include one or more processors, each of which can be a microprocessor. A communication subsystem 311 can perform communication transmission and reception with one or more wireless networks 319. The processor module 338 can be communicatively coupled to an auxiliary input/output (I/O) subsystem 328 which can be communicatively coupled to the electronic device 100. The auxiliary I/O subsystem 328 can take the form of a variety of different navigation tools 227 (multi-directional or single-directional) such as an optical navigation module or tool as illustrated in the exemplary implementation shown in FIG. 1. In other implementations, a trackball, thumbwheel, a navigation pad, a joystick, touch-sensitive interface, or other I/O interface can be used. Other auxiliary I/O subsystems can include external display devices and externally connected keyboards (not shown). While the above examples have been provided in relation to the auxiliary I/O subsystem 328, other subsystems capable of providing input or receiving output from the electronic device 100 are considered within the scope of this disclosure. Additionally, other keys can be placed along the side of the electronic device 100 to function as escape keys, volume control keys, scrolling keys, power switches, or user programmable keys, and can likewise be programmed accordingly.

Additionally, in at least one embodiment, the processor module 338 can be communicatively coupled to a serial port (for example, a Universal Serial Bus port) 330 that facilitates communication with other devices or systems via the serial port 330. A display 322 can be communicatively coupled to processor module 338 to display information to an operator of the electronic device 100. When the electronic device 100 is equipped with a keyboard 332, which may be physical or virtual, the keyboard 332 can be communicatively coupled to the processor module 338. The electronic device 100 can include a speaker 334, a microphone 336, random access memory 326 (RAM), and flash memory 324, all of which may be communicatively coupled to the processor module 338. Additionally, a photosensor 331 can be optionally included. As indicated above, the photosensor 331 can be either a standalone device or incorporated into the camera. The photosensor 331 can be communicatively coupled to the processor module 338. As described above the photosensor can be a camera 323 or an ambient light sensor 329. Additionally, the electronic device 100 can include a holster sensor 335 that is communicatively coupled to the processor module 338. The holster sensor 335 can determine whether the electronic device is within a holster.

Additionally, a vibrator 341 comprising a vibrator motor can be communicatively coupled to the processor module 338. The vibrator 341 can generate vibrations in the electronic device 100. Other communication subsystems 340 and other device subsystems 342 can be generally indicated as being communicatively coupled to the processor module 338. An example of a communication subsystem 340 is a short range communication system such as BLUETOOTH® communication module or a WI-FI® communication module (a communication module in compliance with IEEE 802.11b). The other communication subsystems 340 and other device subsystems 342 and their associated circuits and components can be communicatively coupled to the processor module 338. Additionally, the processor module 338 can perform operating system functions and can enable execution of programs on the electronic device 100.

Furthermore, the electronic device 100 can be equipped with components to enable operation of various programs. In an exemplary embodiment, the flash memory 324 can be enabled to provide a storage location for the operating system 357, device programs 358, and data. The operating system 357 can be generally configured to manage other programs 358 that are also stored in memory 324 and executable on the processor module 338. The operating system 357 can honor requests for services made by programs 358 through predefined program interfaces. More specifically, the operating system 357 can determine the order in which multiple programs 358 are executed on the processor module 338 and the execution time allotted for each program 358, manages the sharing of memory 324 among multiple programs 358, handles input and output to and from other device subsystems 342, and so on. In addition, operators can typically interact directly with the operating system 357 through a user interface usually including the display screen 322 and keyboard 332. While in an exemplary embodiment the operating system 357 can be stored in flash memory 324, the operating system 357 in other embodiments is stored in read-only memory (ROM) or similar storage element (not shown). As those skilled in the art will appreciate, the operating system 357, device program 358 or parts thereof can be loaded in RAM 326 or other volatile memory. In one exemplary embodiment, the flash memory 324 can contain programs 358 for execution on the electronic device 100 including an address book 352, a personal information manager (PIM) 354, and the device state 350. Furthermore, programs 358 and other information 356 including data can be segregated upon storage in the flash memory 324 of the electronic device 100.

When the electronic device 100 is enabled for two-way communication within the wireless communication network 319, the electronic device 100 can send and receives signal from an electronic communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 100 can require a unique identifier to enable the electronic device 100 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems can use a Removable User Identity Module (RUIM) in order to communicate with the CDMA network. The RUIM and SIM card can be used in a multitude of different electronic devices 100. The electronic device 100 can operate some features without a SIM/RUIM card, but a SIM/RUIM card is necessary for communication with the network 319. A SIM/RUIM interface 344 located within the electronic device 100 can allow for removal or insertion of a SIM/RUIM card (not shown). The SIM/RUIM card can feature memory and holds key configurations 351, and other information 353 such as identification and subscriber related information. With a properly enabled electronic device 100, two-way communication between the electronic device 100 and communication network 319 can be possible.

If the electronic device 100 is enabled as described above or the communication network 319 does not require such enablement, the two-way communication enabled electronic device 100 is able to both transmit and receive information from the communication network 319. The transfer of communication can be from the electronic device 100 or to the electronic device 100. In order to communicate with the communication network 319, the electronic device 100 in the presently described exemplary embodiment can be equipped with an integral or internal antenna 318 for transmitting signals to the communication network 319. Likewise the electronic device 100 in the presently described exemplary embodiment can be equipped with another antenna 316 for receiving communication from the communication network 319. These antennae (316, 318) in another exemplary embodiment can be combined into a single antenna (not shown). As one skilled in the art would appreciate, the antenna or antennae (316, 318) in another embodiment can be externally mounted on the electronic device 100.

When equipped for two-way communication, the electronic device 100 can include a communication subsystem 311. As is understood in the art, this communication subsystem 311 can support the operational needs of the electronic device 100. The subsystem 311 can include a transmitter 314 and receiver 312 including the associated antenna or antennae (316, 318) as described above, local oscillators (LOs) 313, and a processing module 320 which in the presently described exemplary embodiment can be a digital signal processor (DSP) 320.

Communication by the electronic device 100 with one or more wireless networks 319 can be any type of communication that both the one or more wireless networks 319 and electronic device 100 are enabled to transmit, receive and process. In general, these can be classified as voice and data. Voice communication generally refers to communication in which signals for audible sounds are transmitted by the electronic device 100 through the one or more communication networks 319. Data generally refers to all other types of communication that the electronic device 100 is capable of performing within the constraints of the one or more wireless networks 319.

In other embodiments, different components of the above system might be omitted in order provide the desired electronic device 100. Additionally, other components not described above may be required to allow the electronic device 100 to function in a desired fashion. The above description provides only general components and additional components can be required to enable system functionality. These systems and components would be appreciated by those of ordinary skill in the art.

Figure 4A:
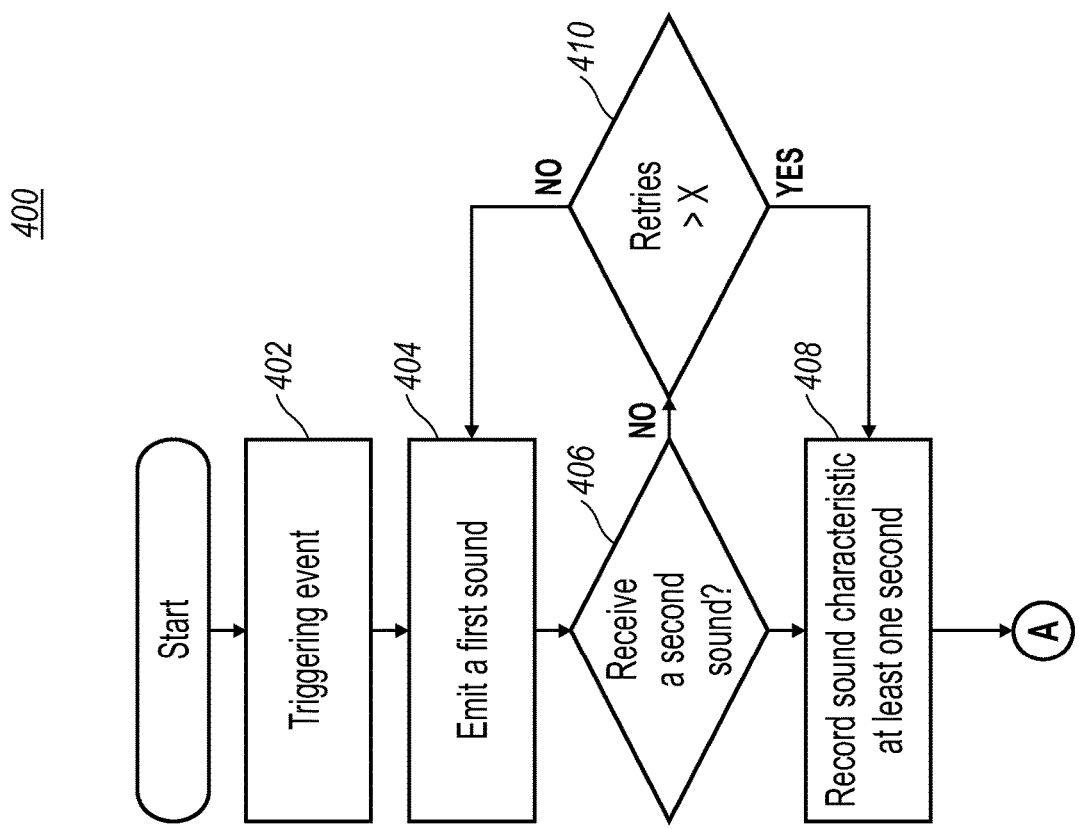
FIG. 4A-4C is a schematic view of a flowchart illustrating a method for execution on an electronic device to modify an output parameter in accordance with an exemplary implementation.
Figure 4B:
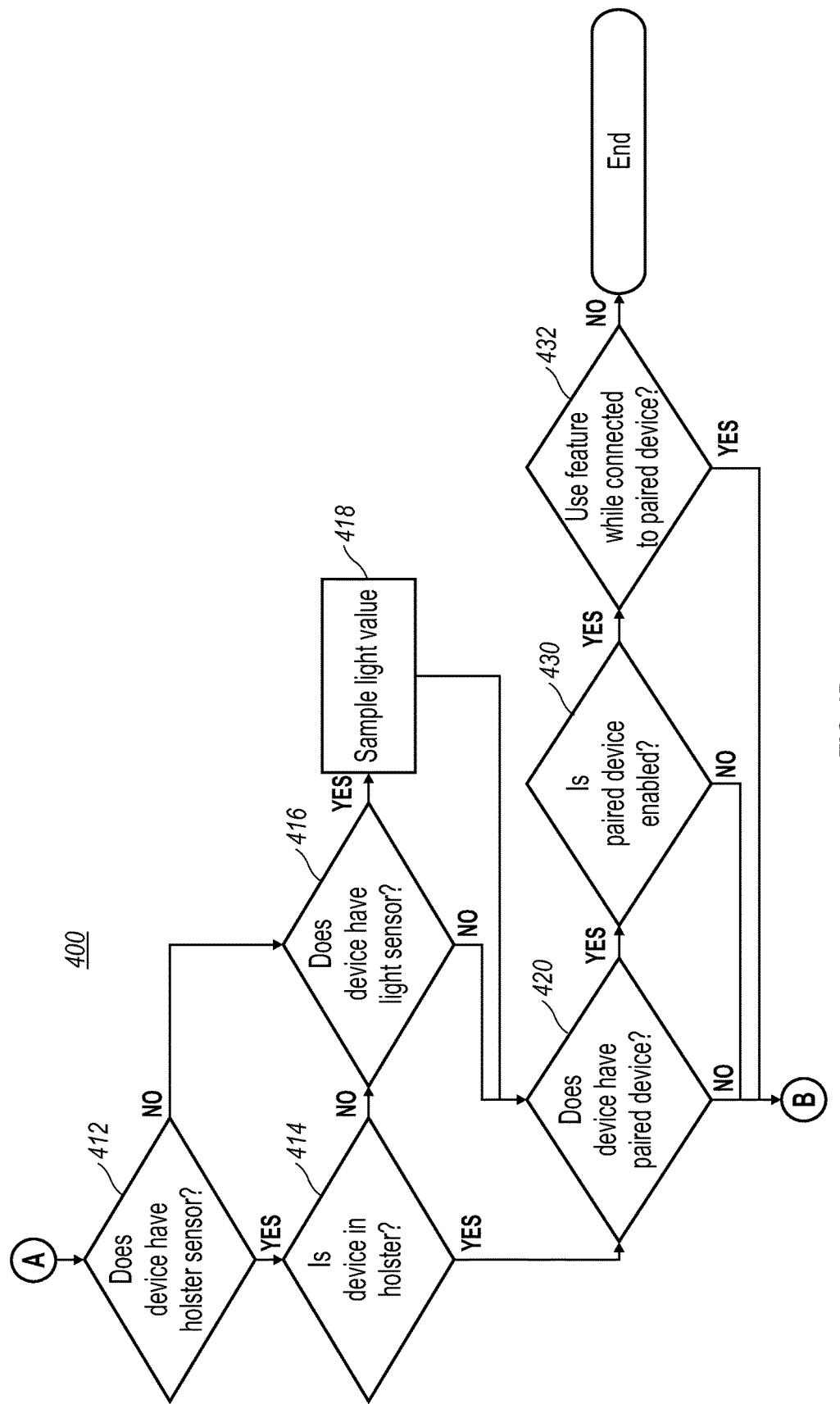
Figure 4C:
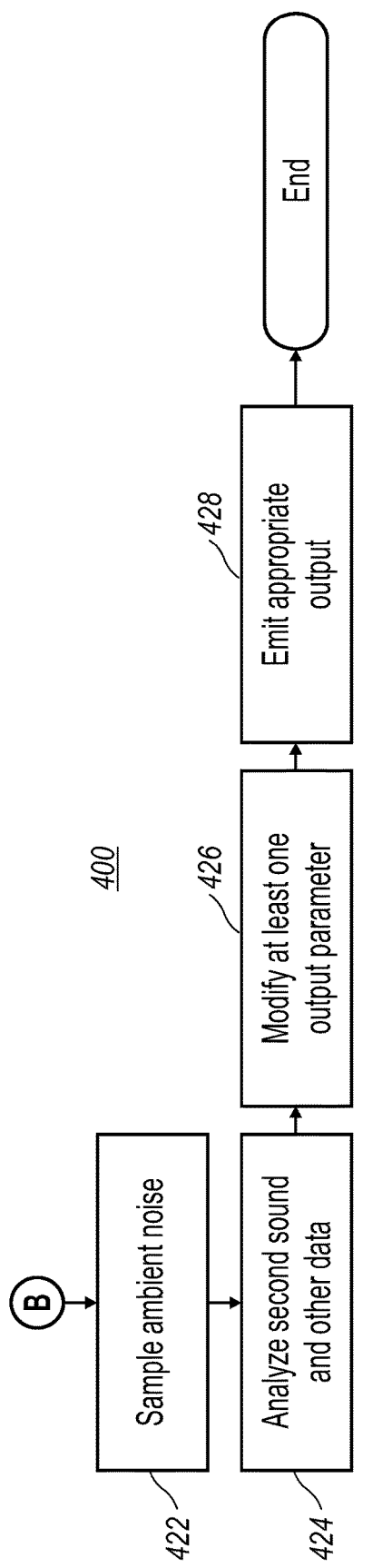

Referring now to FIGS. 4A-4C, which illustrates an exemplary method of operating the electronic device 100. The exemplary method is provided by way of example, as there are a variety of ways to carry out the method. Some steps of the method can be omitted in at least one implementation. In one or more implementations, the method can be performed by the processor module 338 of the electronic device 100. The methods can be executed or otherwise performed by one or a combination of various systems. The methods described below can be carried out using the electronic device and communication network shown in FIGS. 1-3 by way of example, and various elements of these figures are referenced in explaining the exemplary method. Each block show in FIGS. 4A-4C represents one or more processes, methods, or subroutines, carried out in the exemplary method. While the majority of examples are described herein in relation to a call or a message, the present disclosure can be applied without receipt of a call or message. The method 400 can begin at block 402.

At block 402, the method detects a triggering event. For example, the triggering event can be detected by processor module of the electronic device 100. The triggering event can be a variety of different events that cause the electronic device 100 to modify the notification that is to be provided to an operator of the electronic device 100. For example, the triggering event can be the receipt of an incoming call. Other triggering events can include receipt of a text message, transmission of a text message, transmission of an email, receipt of an email, an alarm, a predetermined time period, a set time (for example at a specific time of day), execution of an application or another indication that an event has occurred on or at the electronic device 100. For ease of description, the triggering event will be described as an incoming call. Based upon the receipt of the incoming call, the electronic device 100 proceeds according to execute the method 400. In at least one implementation, after the triggering event is detected the method can proceed to block 404.

At block 404, a first sound is emitted from the electronic device 100. The emission of the first sound can be from the at least one sound output device, such as a speaker 334, of the electronic device 100. The emitted first sound can be a special sound emitted by the device, a standard sound emitted by the device or a combination thereof. The special sound can be a sound that is selected after analysis is performed for a first time or based upon one or more sensors. In at least one embodiment, the special sound can be an ultrasonic sound that is inaudible to the operator. In one example, the first sound can be a ringtone that is emitted when a call is received. In at least one example, the emission of the first sound and reception of the second sound can be repeated for a predetermined number of cycles so as to obtain an average of the received second sounds. This can aid in determining the portion of the second sound that is based on the emitted first sound. In at least one implementation, after the first sound is emitted the method can proceed to block 406.

At block 406, a second sound is received. The second sound can be based at least in part on the first sound. The second sound can also include ambient noise such as noise from vehicles, chatter in a dinner, airport sounds, and other sounds which are in the ambient area. The portion of the second sound that is based at least in part on the first sound can include a reflection or attenuation of the first sound. The reception of the second sound can be received by at least one sound receiving device, such as a speaker 334, of the electronic device 100.

If the electronic device 100 does not receive a second sound, the electronic device 100 can repeat the emission of the first sound for a predetermined number times (X) (see block 410). As illustrated in block 410, the number of times (X) that the method 400 repeats emitting the first sound and receiving the second sound can be a predetermined number of times (X). In at least one example, the predetermined number can be three. In other instances, the predetermined number can be between three and ten or the predetermined number can be two. In other embodiments, the method can omit the re-emission of the first sound and execute a different routine. For example, the different routine can include varying the frequency, amplitude or a combination thereof of the first sound so that a second sound can be received by the electronic device. In another example, the different routine can be one in which the method does not repeat the emission of the first sound, but rather uses different input for example input from one or more sensors. In at least one embodiment, the first sound can be varied as the emission of the first sound is repeated. For example, on subsequent emissions of the first sound, the volume, frequency or amplitude of the sound can be varied.

If the second sound is received (at block 406), the method 400 can optionally record at least one characteristic of the second sound. In at least one implementation, the at least one characteristic is not recorded, but only analyzed. In one or more implementations, the at least one characteristic is only temporarily recorded and stored in volatile memory, for example RAM 326, of the electronic device 100. In at least one implementation multiple characteristics of the sound are recorded.

At block 412, the presence of one or more holster sensor is detected. The detection of the holster sensor allows the electronic device 100 to determine whether the device has a holster sensor which can in turn detects whether the device is within the holster (block 414). If the electronic device 100 does not have a holster sensor, the electronic device 100 can detect the presence of one or more ambient light sensors (block 416). If the electronic device 100 has an ambient light sensor, the method 400 can sample the ambient light (block 418). The sampling of the ambient light can be recorded, and can be analyzed. In other implementations the ambient light can analyzed without being recorded or only a portion of the data can be recorded. In one or more embodiments, only the result of the processing of the ambient light data can be recorded.

At block 420, the method 400 determines whether the electronic device 100 has a paired device. The determination of whether the electronic device 100 has a paired device, such as the BLUETOOTH® headset 104 (shown in FIG. 6A), can be through a sensor that indicates whether the device is paired. As indicated above, this sensor can be either a hardware or software sensor. If it is determined that the electronic device 100 has a paired device, then the method 400 can determine if the paired device is enabled (block 430). If the paired device is enabled, a further determination can be made as to the use of the modification of the output parameter can be made (block 432). For example, the operator can enable modification of the output parameter regardless of whether at least one paired device is communicatively coupled to the electronic device 100. In another example, the operator can disable modification of the output parameter when the at least one paired device is communicatively coupled to the electronic device 100. In yet another example, the operator can enable modification of the output parameter when the at least one paired device is communicatively coupled to the electronic device 100. Additionally, the pairing can also include a security feature, which only allows devices to be paired if certain security standards are satisfied. For instance, the pairing of the devices can require that a security key be exchanged by at least one device or that a security key is exchanged by both devices. Furthermore, it is possible to only allow pairing after a device password has been input. This allows for communication between the paired devices to be conducted without other devices being able to receive the communications.

At block 422, a third sound is received. The third sound can include ambient noise. The receiving of the third sound can allow method 400 to determine the difference between the second sound and the third sound so as to better distinguish the difference between a portion of the second sound that is based upon the first sound and the ambient noise in the second sound. The difference can be determined using different sample sizes and spacing between the receiving of the second sound and receiving of the third sound. In at least one embodiment, the receiving of the third sound can occur before the emission of the second sound. In yet other examples, the receiving of the third sound can be before the emission of the first sound and after the reception of the second sound. In this later example, the ambient noise can be determined so as to allow for variations of the ambient noise. In other examples, the duration of the reception of the third sound can be varied to accommodate changes in the ambient sound. The ambient sound can be characterized by one of the average ambient noise, average plus high points of the ambient noise, and average with frequencies of the first sound.

At block 424, the second sound is analyzed. In at least one example, the analysis of the second sound can include comparing at the processor of the electronic device at least one characteristic of the first sound to at least one corresponding characteristic of the second sound. In other implementations, the analysis can include additional inputs and data. For example, the additional input and data can include but is not limited to output data from at least one sensor, form example the holster sensor and paired device sensor, and data from the reception of the third sound.

At block 426, at least one output parameter is modified. The modification of the at least one output parameter can be based upon the analysis of block 424. In one implementation, the modification of the output parameter is in response to the comparison of the first sound and the second sound and the output data from the at least one sensor.

At block 428, an appropriate notification is emitted. The appropriate notification is based upon the output parameter. The appropriate notification can be emitted by the at least one notification device of the electronic device. The appropriate notification can be a ringtone that has been modified in light of the above method. For example, the ringtone can be modified such that at least one of the frequency, amplitude, signal strength, signal quality, duration, or some combination thereof is changed compared to the standard ringtone of the electronic device. The appropriate notification can further include a notification light that is steady or flashes at predetermined intervals. Furthermore, the notification light can change colors. The notification light can be provided when a determination that the electronic device 100 is not in a holster and is in a dark environment. A vibration alert can be generated when the electronic device is in the holster and the ambient noise is at a high level. The vibrational alert and notification light can be used in combination with the modified ringtone. Additionally, when the electronic device 100 is in an environment with low levels of ambient noise, the ringtone can be silenced or reduced to a short beep. Furthermore, the vibrational alert can be omitted or included (in at least one example based on operator preference) when the electronic device 100 is in an environment with low levels of ambient noise. Other examples of appropriate signals are given below in relation to the modification of the output parameter and the associated output of the electronic device 100.

The examples provided in FIGS. 5A-5C, 6A-6C, and 7A-7B illustrate an electronic device 100 in the form of a smartphone. In other implementations, the electronic device could be any electronic device. As described herein, the modification of the output parameter is presented with respect to modifying a ringtone, but can apply to any of the output parameters that control any of the notification devices as described herein. FIGS. 5A-5C, 6A-6C, and 7A-7B are not to scale and are provided for illustrative purposes.

Figure 5A:
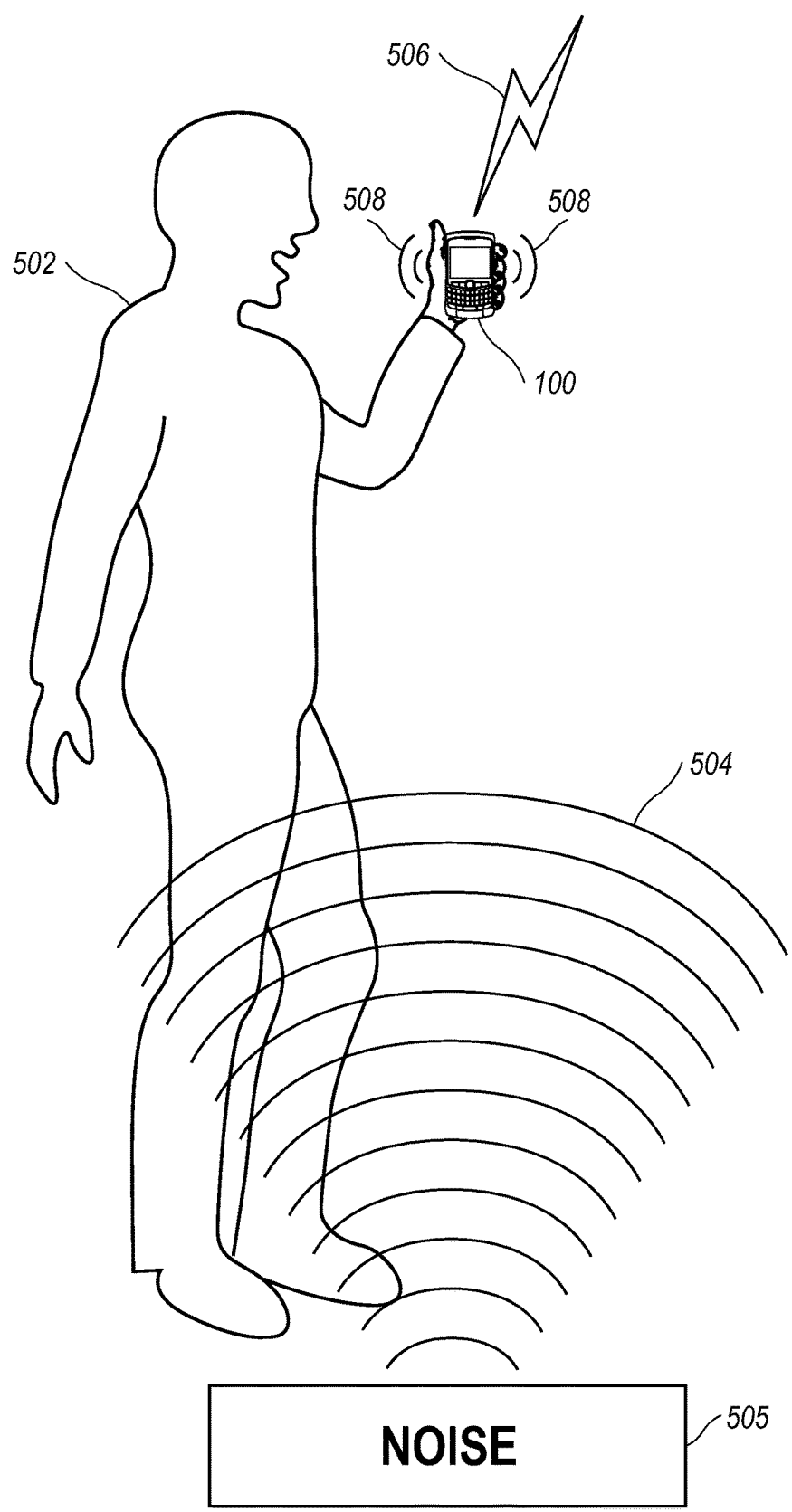
FIG. 5A is an overview diagram of an electronic device being used in an environment having ambient noise.
Figure 5B:
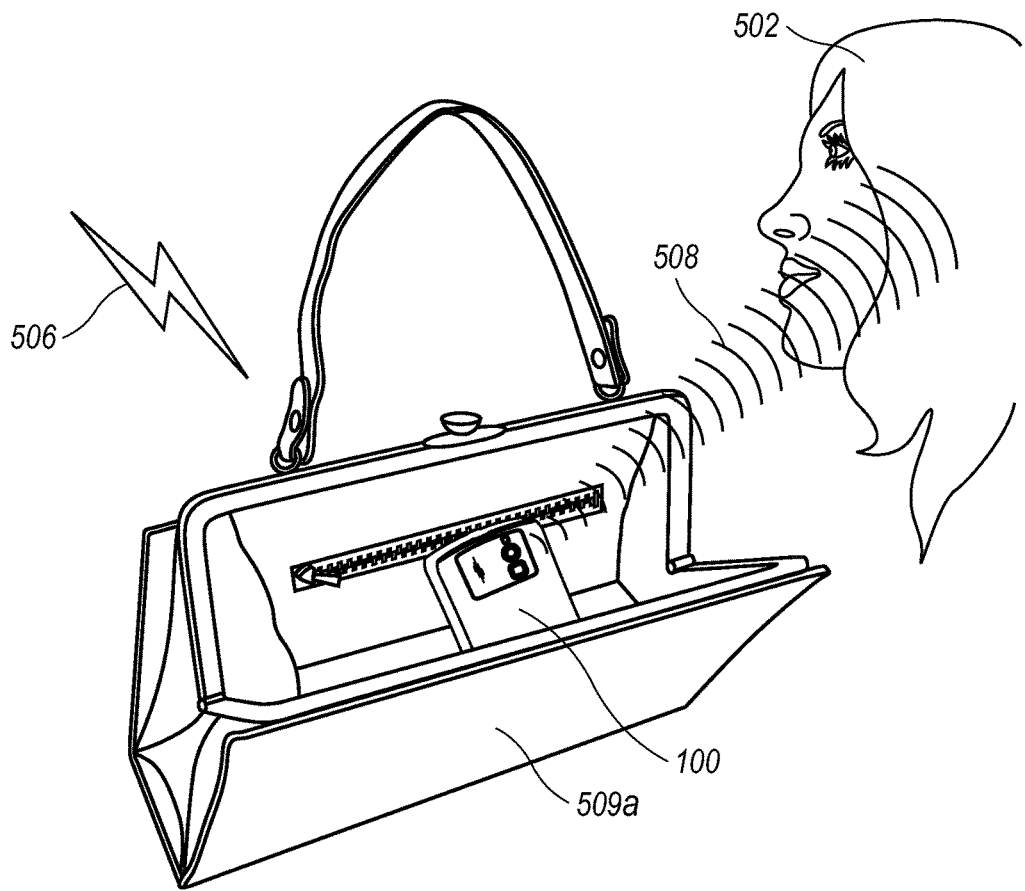
FIG. 5B is an overview diagram of an electronic device within an open container which obstructs audio notifications from the electronic device.
Figure 5C:
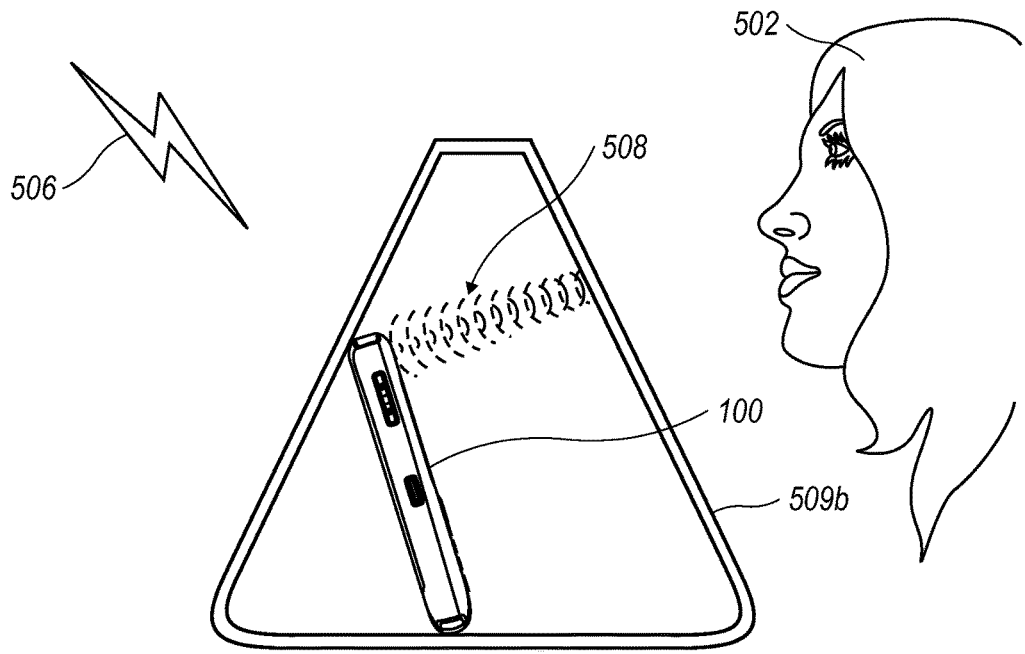
FIG. 5C is an overview diagram of an electronic device within a closed container, which obstructs audio notifications from the electronic device.

Referring now to FIGS. 5A-5C, an electronic device 100 and an operator 502 are illustrated. As illustrated in FIG. 5A, the electronic device 100 is operated in an environment that has a high level of ambient noise 505. FIG. 5A also illustrates the ambient noise sound waves 504. When the electronic device 100 receives an incoming communication illustrated by 506, the electronic device 100 can generate an output parameter which is output via a notification device. As illustrated, the output parameter causes a speaker to output sound 508. When the electronic device receives the incoming communication, which in at least one embodiment can be a trigger event, the processor can execute the method 400 as described above.

When an electronic device 100 does not implement the above described method 400, the electronic device 100 typically allows the operator 502 to select between a number of predetermined volume levels for a ringtone. For example, the predetermined volume levels can be a high, medium, and low level. While in most instances the ambient noise 505 is such that the ringtone can be heard by the operator 502, the ambient noise 505 in at least some instances can affect the hearing of the ringtone or make it difficult to hear the ringtone. For example, the frequencies and amplitudes of the ambient noise 505 can mask the ringtone. The present technology as described herein can be implemented to enable the operator 502 to assist the operator in hearing the ringtone even in environments where the ambient noise 505 makes it difficult to hear certain ringtones.

The present technology can also be implemented to allow an operator 502 to hear a ringtone when the electronic device 100 is within an obstructing, isolating or muffling environment such as a purse illustrated in FIGS. 5B and 5C. In the example shown in FIG. 5B, the purse 509a is in an open configuration. In the open configuration, the purse 509a allows some of the emitted ringtone sound 508 to escape the purse, but the ringtone sound 508 can be muffled, attenuated, muted, or otherwise modified. When the ringtone sound 508 is different than what is normally expected by the operator 502, the operator may not hear the ringtone sound 508 and thereby inadvertently miss notification of the incoming communication 506.

FIG. 5C illustrates another example of where the ringtone sound 508 is muffled, attenuated, muted, or otherwise modified. The electronic device 100 is located within a closed purse 509b. When the purse 509b is closed, the ringtone sound 508 emitted by the device can be further muffled, attenuated, muted, or otherwise modified as compared to the open purse 509a. While some portion of the ringtone sound 508 can be amplified by the open purse 509a or the closed purse 509b, it is expected that most of the sounds will be muffled, attenuated, muted, or otherwise modified. As shown in FIG. 5C, at least a portion of the ringtone sound 508 can be reflected off of the wall of the closed purse 509b and back to the electronic device 100. Other portions (not shown) of the ringtone sound can cause the closed purse 509b to vibrate and produce additional sounds. Additionally, other portions of the ringtone sound (not shown) can penetrate the material of the purse 509b. Still other portions of the ringtone sound (not shown) can be reflected off of the purse 509b and not return to the electronic device 100.

While some the examples given herein relate to a purse, the electronic device 100 can be concealed within other containers such as a briefcase, backpack, and carrying case. Additionally and alternatively, if the electronic device 100 is disposed in an environment that is quiet, the preset ringer or signal volume can be too high and irritate the operator 502 or others in the nearby vicinity.

Figure 6A:
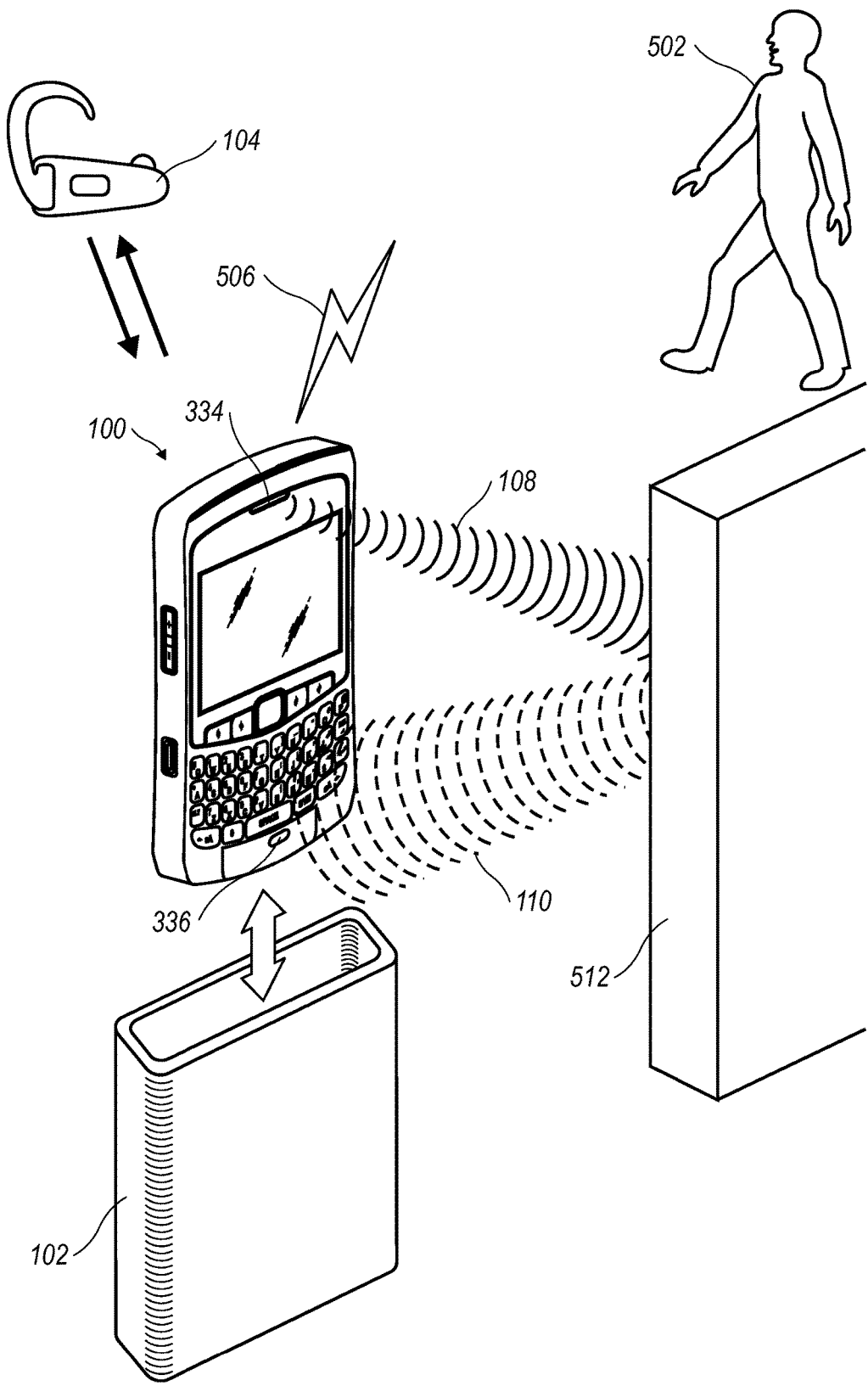
FIG. 6A is an overview diagram of an electronic device in an environment in accordance with an exemplary implementation.
Figure 6B:
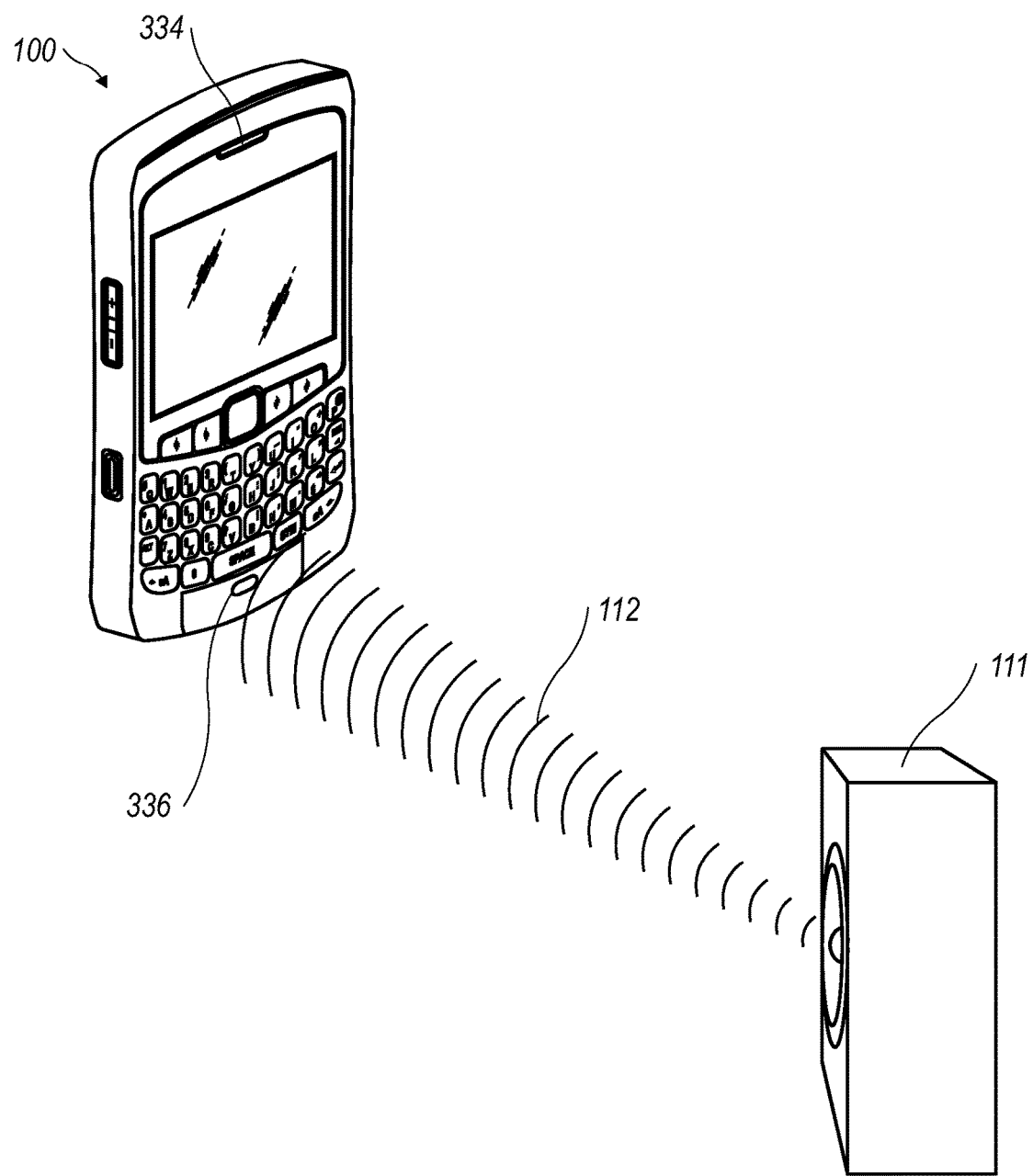
FIG. 6B is an overview diagram of an electronic device operating in an environment having ambient noise which interferes with audio notifications in accordance with an exemplary implementation.
Figure 6C:
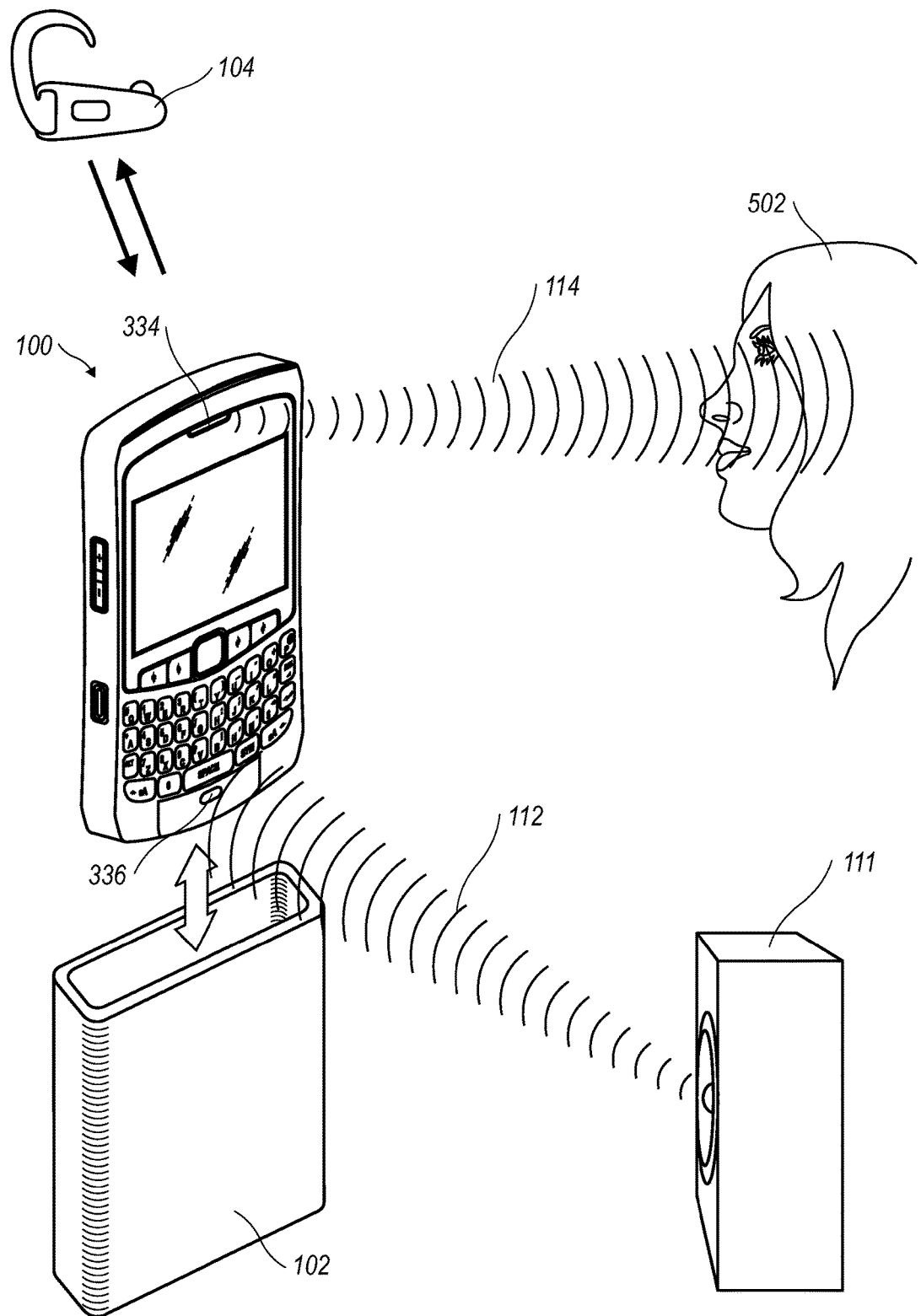
FIG. 6C is an overview diagram of an electronic device providing a modified notification in accordance with an exemplary implementation.

As indicated above, it should be appreciated that FIGS. 6A-6C are not to scale. As shown in FIG. 6A, electronic device 100 can be configured to be received in holster 102 and can include a sensor (not shown) for determining whether the electronic device is disposed in the holster 102. Electronic device 100 can also be configured to communicate with a paired device 104, such as a BLUETOOTH® headset. While the paired device 104 is illustrated as a BLUETOOTH® headset, the paired device 104 can be a variety of different devices. For example, the paired device 104 can be a keyboard, a display, a stereo, a car navigation unit, a radio, a laptop, another electronic device, and a desktop computer. The paired device 104 is shown as being communicatively coupled to the electronic device 100 via a short range wireless communications. In other implementations, the paired device 104 can be communicatively coupled to the electronic device 100 via a wired connection. In yet other embodiments, the paired device 104 can be communicatively coupled to the electronic device 100 via a combination of wireless and wired technologies As shown in FIG. 6A, the electronic device can emit a first sound 108 and receive a second sound 110 that is based at least in part on the first sound. As shown, the first sound 108 is emitted by the device and hits a wall 512. The wall 512 reflects a portion of the first sound 108 back to the electronic device 100 in the form of a second sound 110. The second sound 110 as indicated above is at least partially modified by the reflection off of the wall 512. In at least one example the reflection off of the wall might not change the characteristics of the first sound 108. The first sound 108 can be emitted by sound output device, for example a speaker 334. Other sound output devices as described above are also considered within the scope of this disclosure. The second sound 110 can be received by a sound receiving device, for example a microphone 336. Other sound receiving devices as described above are also considered within the scope of this disclosure.

The first sound 108 can be a ringtone sound, a low-pitch sound, a preset tone, a high-pitch sound, a sound above the range of average human hearing, a sound below the range of average human hearing, or other sound which can be detected by a sound receiving device. The emission of the first sound 108 can be at a predetermined time or based upon an event at the electronic device 100. The triggering event occurring at the electronic device 100 can include receipt of an incoming communication such as a telephone call, a text message, a multi-media message, a chat message, a voice-over-ip telephone call, or other message. The triggering event can also include an application specific event such as a game alert message, a navigation communication, or an alarm. The emitted first sound 108 can further be a sound that is generated in response to any of these triggering events. The electronic device 100 can also be further provided with other notification devices that provide for other notifications. For example, a notification light can be included or a display can present notification icons, and messages to an operator. The notification device can also include a vibrator as described above.

In at least one embodiment, the operator 502 can select the acceptable emissions of the first sound 108. For example in some environments, the emission of first sound 108 can be undesirable and the operator 502 can prohibit the emission of the first sound 108 from the electronic device 100. In other embodiments, the user can select an automatic emission of the first sound 108, where the first sound 108 is selected as described herein. Additionally, in at least one embodiment, the operator 502 can select the first sound 108 that can be emitted. For example, in some environments, it might be desirable to limit the first sound 108 to a given pitch, frequency or other measure. Additionally, the operator can limit the duration of the first sound 108. The above controls can be implemented using a dialog box on the display of the electronic device 100. In other embodiments, the user controls can be contained within a specific application running on the electronic device 100.

While not shown in FIG. 6A, the second sound 110 can include other sounds such as ambient noise. As indicated above, once the second sound 110 is received by the electronic device 100, the electronic device 100 can modify an output parameter of the electronic device 100 in response to the comparison of the first sound 108 and the second sound 110. While in at least one embodiment, the modification of the output parameter of the electronic device 100 is in response to the comparison of the first sound 108 and the second sound 110, the modification can be based on other types of analysis that can include this analysis and additional analysis or not include this analysis and include other analysis.

While the present technology contemplates performing the analysis based on the second sound 110 received at the at least one sound receiving device, the technology can also record the second sound 110 received at the at least one sound receiving device. The recording of the second sound 110 can be for a predetermined period of time, such that the length of recording can be set by a manufacturer, operator, or in dependence upon another indicator such as the emitted first sound 108. In other embodiments, the predetermined period of time can vary depending upon whether a first sound 108 has been emitted within a predetermined period of time of emission. This would allow for greater flexibility in determining the ambient sound so as to generate a ringtone that can be distinguished over the ambient sound.

While only one sound receiving device is necessary to implement the current technology, other embodiments can include multiple sound receiving devices. For example, when multiple sound receiving devices are included, the electronic device 100 can better sense the second sound 110 and ambient noise. When multiple sound receiving devices are included, it is possible to receive additional second sound data when one of the sound receiving devices is covered for example by a holster 102.

As shown in FIG. 6B, the sound receiving device is a microphone 336. The microphone 336 can also be used to receive ambient noise 112 coming from a speaker 111. While only a single speaker 111 is shown, the present technology can sense ambient noise 112 coming from multiple speakers. The speaker 111 can be a speaker at a bar, restaurant, entertainment park, or other ambient area where speakers are found. Furthermore, the present technology can sense ambient noise 112 coming from more than one type of source. Additionally, the ambient noise 112 can come from sources other than a speaker 111, for example traffic, wind, or other source that is capable of producing sound. The present technology receives the ambient noise 112 via an at least one sound receiving device such as the microphone 336. Yet in other embodiments, a separate sound sensor can be implemented to detect the ambient noise. In other embodiments, both the microphone 336 and one or more sound sensors can be implemented. When only the microphone 336 is implemented, the electronic device 100 benefits from reduced mechanical complexity and decreased weight. When a separate sound sensor is implemented, the sound sensor can be specifically configured for specific sounds. For example, the one or more sound sensors can be configured to sense specific frequencies, amplitudes, characteristics of sound, signal strength, or signal quality. In some embodiments, the sensor can be configured for sensing multiple ones of specific frequencies, amplitudes, characteristics of sound, signal strength, or signal quality. When multiple sensors are implemented, the analysis of the sound received is enhanced to further characterize the sound.

In at least one embodiment, the data pertaining to the ambient noise 112 can be compared with information contained in memory 324 or a database. The information contained in the memory 324 or database can correspond to known environments, environmental conditions or environments in which the device has been operated or other known environments.

FIG. 6C illustrates the at least one notification device in the form of a speaker 334 emitting a modified notification in the form of a modified ringtone 114. The modified notification can be based on comparison of at least one characteristic of the first sound to a corresponding characteristic of the second sound. As described above, the modified notification can also be based on additional data. As illustrated in FIG. 6C, the modified ringtone 114 is emitted by the electronic device 100 such that the modified ringtone 114 can be distinguished by the operator 502 over the ambient noise 112. For example, the modified ringtone 114 can have characteristics such that the frequency of the modified ringtone 114 is different from that of the ambient noise 112. Additionally, the signal strength signal quality of the modified ringtone 114 can be different from the ambient noise 112.

Other notifications can be implemented in addition to the modified ringtone 114 or instead of the modified ringtone 114. For example, the modified notification can be based on data received from at least one sensor such as a holster sensor or pairing sensor as described above. If the holster sensor is present and indicates that the electronic device 100 is in the holster 102, then the modified notification can be a modified vibrational alert generated by the vibrator. The electronic device 100 can also modify the ringtone to be a modified ringtone 114 that can be heard by the operator 502 through the holster 102. In another embodiment, the ringtone 114 can be lowered or non-existent when a detected paired device such as a BLUETOOTH® headset 104 is detected. For example, when a BLUETOOTH® headset 104 is detected the electronic device 100 can only send a signal to the BLUETOOTH® headset 104 rather than emitting a modified ringtone 114. In another embodiment, when the BLUETOOTH® headset 104 is communicatively coupled to the electronic device 100, a specialized ringtone 114 can be emitted from the speaker 334 of the electronic device 100 that can be more easily heard when the operator is wearing the BLUETOOTH® headset 104. Other examples of notifications are considered within the scope of this disclosure as well.

In at least one embodiment, the operator 502 can control one or more aspects of the modification of the at least one notification. For example, the operator 502 can set the modification of the output parameter based upon the at least one sensor detected. In another example, the operator 502 can set the modification of the output parameter based upon the level of ambient noise 112. For example, when the level of ambient noise 112 is low, the operator can have the output parameter set so that only a notification light is provided. In another example, when the level of ambient noise 112 is high, the output parameter can be modified to cause the ringtone 114 to be emitted at a high level or at a different frequency than the predominate frequency of the ambient noise (but also one that will not be masked by the predominate frequency) and cause the vibrator to vibrate the electronic device 100. In yet another example, when the level of ambient noise 112 is high, the output parameter can be modified to cause the ringtone 114 to be emitted at a high level and at a different frequency than the predominate frequency of the ambient noise (but also one that will not be masked by the predominate frequency) and cause the vibrator 341 to vibrate the electronic device 100.

Figure 7A:
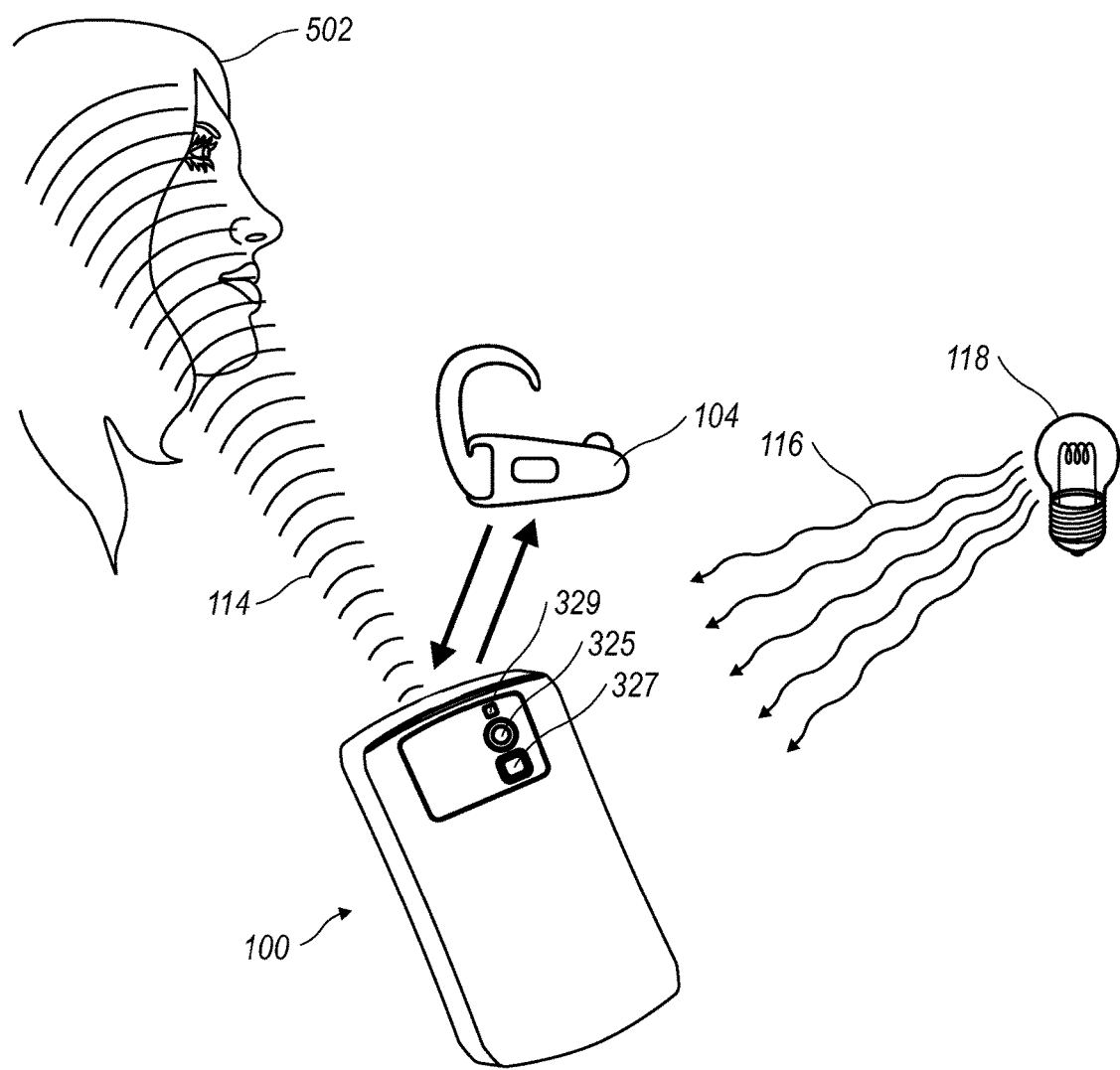
FIG. 7A is an overview diagram of an electronic device operating in a lighted environment in accordance with an exemplary implementation.

The modification of the output parameter can be based on at least one sensor. One of the sensors as described above was the holster sensor. Another sensor is the ambient light sensor 329 as illustrated in FIG. 7A. While a separate ambient light sensor 329 is provided, the ambient light can also be sensed via a photosensor 331 of a camera 323. The ambient light sensor 329 can detect light 116 coming from one or more light sources 118. While on a single light source 118 is illustrated in FIG. 7A. The electronic device 100 can use the data received by the ambient light sensor 329 to modify the output parameter in accordance with one implementation. The modification of the output parameter can be such that when the electronic device 100 is in lighted environment such as the one illustrated in FIG. 7A, the electronic device 100 can receive data to indicate that the device is in an environment that allows for sound to be readily transmitted to the operator 502.

The modification of the output parameter can be based upon the amount of light detected by the ambient light sensor 329. In at least one embodiment, the ambient light sensor 329 can detect the presence of indoor lighting as compared with natural lighting. When natural lighting is detected, the output parameter modification can differ from the modification when indoor lighting is detected. For example, the volume level of a ringtone 114 can be increased when the presence of natural lighting is detected, which is indicative of the electronic device 100 being in an outdoor environment which can limit the distance the ringtone 114 emitted by the device can be heard. When indoor lighting is detected, the volume level of the ringtone 114 can be reduced as compared to natural lighting environment. Additionally, the vibrational or light notifications can be modified in natural lighting environment as compared to the indoor lighting environment. For example, no notification light could be emitted when the device is in natural lighting environment because of the reduced chance of seeing the notification light thereby reducing battery drain. These modifications can be controlled by the operator 502 as well.

Figure 7B:
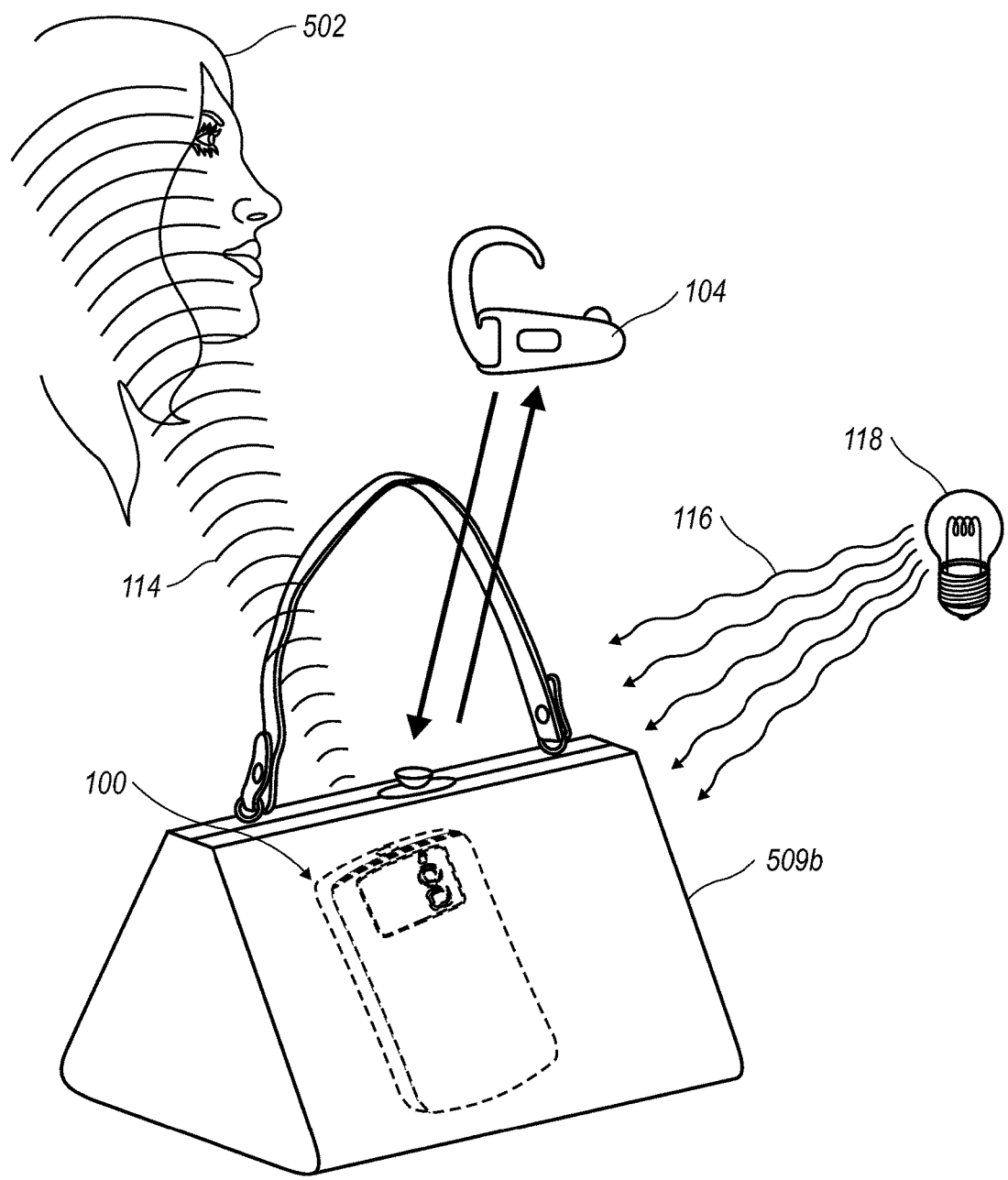
FIG. 7B is overview diagram of an electronic device operating in an unlighted or obstructed environment in accordance with an exemplary embodiment.

FIG. 7B illustrates the electronic device 100 inside of a closed purse 509b. The closed purse 509b reduces or prevents ambient light 116 from reaching the electronic device 100 and its ambient light sensor 329. When the electronic device 100 determines the low light condition as indicated in FIG. 7B, the modification of the output parameter can be changed in relation to that of the environments where there is natural light or indoor lighting. For example, the notification light could be disabled or enabled. In one embodiment, the notification light could be disabled if the time is a set time of day for instance during normal sleeping hours. In other embodiments, when low or no ambient light 116 is detected by the ambient light sensor 329, then the electronic device 100 can emit a ringtone that is at a high level so as to penetrate enclosing structure, here a closed purse 509b. While the electronic device 100 is illustrated within a closed purse 509b, other enclosures are considered within this disclosure that reduce or prevent light from reaching the ambient light sensor 509b. In at least one embodiment, additional sensors can be used to modify the output parameter.

The electronic device 100 can be further enabled to be modified based upon a combination of the data received from the one or more sensors and the ambient noise data in addition to the comparison of the characteristics of the first and second sounds as described herein. The operator can further configure the output parameter to fit common usage of the device and can enable a timing feature so as to further modify the output parameter depending upon the time of day. While the sensors and modifications have been described separately, the present disclosure contemplates combining one or more of the settings and sensors.

Implementation of one or more embodiments may realize one or more advantages, some of which have been mentioned already. The concepts described herein can be flexibly adapted for a variety of devices, carriers and usages. The ways in which the described apparatus may be put to use are countless, and users may benefit from enhanced convenience and functionality.

Exemplary implementations have been described hereinabove regarding the implementation of an electronic device including a modifiable output parameter. Various modifications to and departures from the disclosed implementations will occur to those having skill in the art. The subject matter that is intended to be within the spirit of this disclosure is set forth in the following claims.

The invention claimed is:

1. A method of operating an electronic device, the method comprising:
    receiving notification of an incoming call;
    prior to emitting an audio ringtone:
        emitting a first sound from the electronic device, the first sound being an ultrasonic sound;
        receiving a second sound at the electronic device, the second sound based at least in part on the first sound, wherein the second sound includes ambient noise and a reflected or attenuated sound based upon the first sound;
        receiving a third sound, wherein the third sound includes only the ambient noise;
        determining a differential sound, wherein the differential sound is a difference between the second sound and the third sound, and the differential sound represents the reflected or attenuated sound based upon the first sound;
        comparing, at a processor of the electronic device, at least one characteristic of the first sound to at least one corresponding characteristic of the differential sound;
        receiving, at the processor, output data from at least one paired-device sensor; and
        modifying a frequency and a duration of the audio ringtone in response to the comparison of the first sound and the differential sound and the output data from the at least one paired-device sensor; and
    emitting the audio ringtone using the modified frequency and the modified duration.

2. The method of claim 1, further comprising detecting presence of a holster sensor and performing an additional detection of an ambient light sensor if the presence of the holster sensor is not detected.

3. The method of claim 2, further comprising detecting presence of a paired device and determining if the paired device is an output device.

4. The method of claim 1, wherein the at least one characteristic of the first sound includes a signal strength and the at least one characteristic of the differential sound includes a signal strength.

5. The method of claim 1, wherein receiving of output data from at least one additional sensor comprises receiving output data from an ambient light sensor, and modifying the frequency and the duration of the audio ringtone is based upon the output data from the ambient light sensor.

6. The method of claim 1, further comprising receiving of output data from at least one additional sensor from a holster sensor and modifying the frequency and the duration of the audio ringtone based upon the output data from the holster sensor.

7. The method of claim 1, further comprising receiving of output data further comprises receiving data from a paired device and modifying the frequency and the duration of the audio ringtone is based upon the output data from the paired device.

8. An electronic device comprising:
    at least one notification device;
    at least one sound output device;
    at least one sound receiving device;
    at least one sensor;
    a processor module communicatively coupled to the at least one notification device, the at least one sound output device, the at least one sound receiving device, and the at least one sensor and configured to execute instructions to:
receiving notification of an incoming call;
prior to emitting an audio ringtone:
    trigger emission of a first sound by the at least one sound output device, the first sound being an ultrasonic sound;
    receive data from the at least one sound receiving device indicative of a second sound, the second sound based at least in part on the first sound, wherein the second sound includes ambient noise and a reflected or attenuated sound based upon the first sound;
    receive data from the at least one sound receiving device indicative of a third sound, wherein the third sound includes only the ambient noise;
    determine a differential sound, wherein the differential sound is a difference between the second sound and the third sound, and the differential sound represents the reflected or attenuated sound based upon the first sound;
    compare at least one characteristic of the first sound to a corresponding characteristic of the differential sound;
    receive data from at least one paired-device sensor; and
    modify a frequency and a duration of the audio ringtone in response to the comparison of the at least one characteristic of the first sound to a corresponding characteristic of the differential sound and the data received from the at least one paired-device sensor, wherein information of the frequency and the duration of the audio ringtone is transmitted to the at least one notification device; and
emit the audio ringtone using the modified frequency and the modified duration.

9. The electronic device of claim 8, wherein the processor module is further configured to detect presence a holster sensor and performing an additional detection of an ambient light sensor if the presence of the holster sensor is not detected.

10. The electronic device of claim 9, wherein the processor module is further configured to detect presence of a paired device and determining if the paired device is an output device.

11. The electronic device of claim 8, wherein the at least one characteristic of the first sound includes a signal strength and the at least one characteristic of the differential sound includes a signal strength.

12. The electronic device of claim 8, wherein the instructions further comprises receiving of output data from at least one additional sensor comprising receiving output data from a holster sensor and modifying the frequency and the duration of the audio ringtone based upon the output data from the holster sensor.

13. The electronic device of claim 8, wherein the instructions further comprising receiving data from a paired device and modifying the frequency and the duration of the audio ringtone based upon the output data from the paired device.

14. A non-transitory computer-readable storage medium storing instructions which, when executed by a processor, cause an electronic device to:
receiving notification of an incoming call;
prior to emitting an audio ringtone:
    emit a first sound from the electronic device, the first sound being an ultrasonic sound;
    receive a second sound at the electronic device, the second sound based at least in part on the first sound, wherein the second sound includes ambient noise and a reflected or attenuated sound based upon the first sound;
    receive a third sound, wherein the third sound includes only the ambient noise;
    determine a differential sound, wherein the differential sound is a difference between the second sound and the third sound, and the differential sound represents the reflected or attenuated sound based upon the first sound;
    compare, at a processor of the electronic device, at least one characteristic of the first sound to at least one corresponding characteristic of the differential sound;
    receive, at the processor, output data from at least one paired-device sensor; and
    modify a frequency and a duration of the audio ringtone in response to the comparison of the first sound and the differential sound and the output data from the at least one paired-device sensor; and
emit the audio ringtone using the modified frequency and the modified duration.

* * * * *